US005244333A

United States Patent [19]

Byrne

[11] Patent Number: 5,244,333

[45] Date of Patent: Sep. 14, 1993

[54] PICKUP SWEEPER FOR ROOFING GRAVEL

[75] Inventor: Brian T. Byrne, Chanhassen, Minn.

[73] Assignee: Garlock Equipment Company, Minneapolis, Minn.

[21] Appl. No.: 763,111

[22] Filed: Sep. 20, 1991

[51] Int. Cl.[5] ............ B65G 49/00

[52] U.S. Cl. ............ 414/501; 414/528; 414/786; 198/518; 15/83; 15/340.2; 15/340.3; 104/279

[58] Field of Search ............ 198/518, 311; 414/501, 414/502, 503, 434, 527, 528, 507, 518, 786; 15/340.1, 340.3, 340.2, 83, 82, 340.4; 37/104; 104/279

[56] References Cited

U.S. PATENT DOCUMENTS

| | | | |
|---|---|---|---|
| 2,194,297 | 3/1940 | Drumm | 15/83 |
| 2,964,204 | 12/1960 | Wilson | 15/83 X |
| 3,201,819 | 8/1965 | Wilgus | 15/340.2 X |
| 4,290,820 | 9/1981 | Swisher, Jr. et al. | 198/518 X |

FOREIGN PATENT DOCUMENTS

| | | | |
|---|---|---|---|
| 2145715 | 3/1972 | Fed. Rep. of Germany | 15/340.3 |
| 1255675 | 9/1986 | U.S.S.R. | 104/279 |

*Primary Examiner*—Frank E. Werner
*Attorney, Agent, or Firm*—Keith J. Goar

[57] ABSTRACT

Apparatus and method are described for picking up and removing gravel. The apparatus and method are particularly adapted to the removal of gravel from the surface of a roof when an old roof is being removed or repaired.

16 Claims, 4 Drawing Sheets

PICKUP SWEEPER FOR ROOFING GRAVEL

FIELD OF THE INVENTION

This invention relates to sweeping up and gathering gravel. More particularly, this invention relates to apparatus and method by which gravel found on a flat roof is removed by gathering it up and dispensing it into devices to carry it away.

BACKGROUND OF THE INVENTION

Various mechanisms and methodology have been used in the past to remove gravel that is incorporated into flat asphalt type roofs. There are several reasons that gravel is incorporated into such roofs. It is often used as ballast to hold the roofing material down in windy conditions, particularly when "membrane" or unitary type roof coverings are used. It also serves to protect the roofing materials from the sun, hail and the like. In some applications it serves as a decorative coating. When a roof having such a gravel covering is to be removed or portions of it are to be repaired the old roofing must first be removed. Part of the removal process is the removal of the gravel which covers the old roof. The gravel that is used in such roofing applications varies in size, ranging from a size known in the industry as "pea gravel" up to gravel having a two inch diameter. When this gravel is of the pea gravel size it is most often removed by sweeping. This is accomplished using either hand operated brooms or sweeping machines which use a rotating, solid core brush to move the gravel into windrows where it is subsequently hand shoveled into wheelbarrows and the like. When the gravel is relatively coarse, having a diameter of one to one and a half inches, the solid core brush sweepers cannot effectively move the gravel into windrows. Most frequently such gravel is hand swept and hand shoveled into some sort of transport device such as a wheelbarrow or cart. Considerable labor, expense and time is expended in removing coarse roofing gravel by this means.

It has also been known to use a truck mounted suction device for the removal of coarse gravel to save labor and time. However, such devices are large and very expensive. They generally must be positioned on the ground alongside the building and consist of a large fan that provides suction to a flexible hose. The hose is mounted to a nozzle mechanism that is slowly moved across the roof to remove the gravel by suction to a gathering device mounted on the ground. Because of their size and expense, such devices are generally jobbed out and must be scheduled for each job. This often causes inefficiencies and lost time at job sites.

It has also been known in the past to attempt to remove coarse gravel using towed devices having large solid core brushes which were intended to "sweep" the gravel into an auger mechanism which subsequently moved the gravel to a drag chain that would convey the gravel away. However, such designs were found to be cumbersome because they were towed, they would not "sweep" well using a solid core brush, and frequently clogged in the drag chain and auger devices. A further disadvantage of such devices was the expense of the large solid core brush which had to be replaced periodically due to wear. As a result, such devices found little commercial success and today 99% of the coarse gravel removed from roofs is removed by hand shoveling the gravel into wheelbarrows and the like.

SUMMARY OF THE PRESENT INVENTION

In accordance with the present invention there is provided apparatus and techniques for removing relatively coarse gravel from surfaces, such as roofs, and feeding the gravel to adjacent removal devices. The apparatus of this invention, in one embodiment, comprises:

a) a self propelled carriage intended to be powered by a gasoline engine to propel the pickup sweeper forward for gathering up gravel:

b) a paddle assembly containing multiple paddles to sweep up gravel;

c) a hopper for gathering the gravel from the paddle assembly;

d) conveyor belt means for moving the gravel from the hopper to a follow along transport device In a preferred embodiment, the self propelled carriage comprises a wheeled chassis to which is attached a gasoline powered drive engine for propelling the carriage. Hydrostatic motors are driven by the drive engine to operate various of the apparatus functions. Controls are provided for varying the forward and reverse speed of the carriage. An axially rotatable multipaddled paddle assembly is mounted to the front of the self propelled carriage to sweep gravel forwardly and upwardly into a hopper. The hopper gathers the gravel and funnels it to the base of a belt conveyor. A variable speed hydraulic drive powers the paddle assembly and rotates the conveyor belt to move the gravel from the hopper, upwardly and outwardly. The gravel is fed from the top end of the conveyor to a transport device that follows along side of the pickup sweeper to receive the gravel as it is dispensed by the conveyor.

The method practiced according to the present invention includes the steps of:

1) providing rotatable paddle means;
2) contacting gravel with the paddle means;
3) providing hopper means adjacent to the paddle means;
4) rotating the paddle means in a manner such that the gravel is gathered and lifted into the hopper means;
5) providing conveyor means; and
6) positioning the conveyor means in relation to the hopper means such that the gravel is removed from the hopper means to a point where it can be received into a transport device.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figures 1, 2:
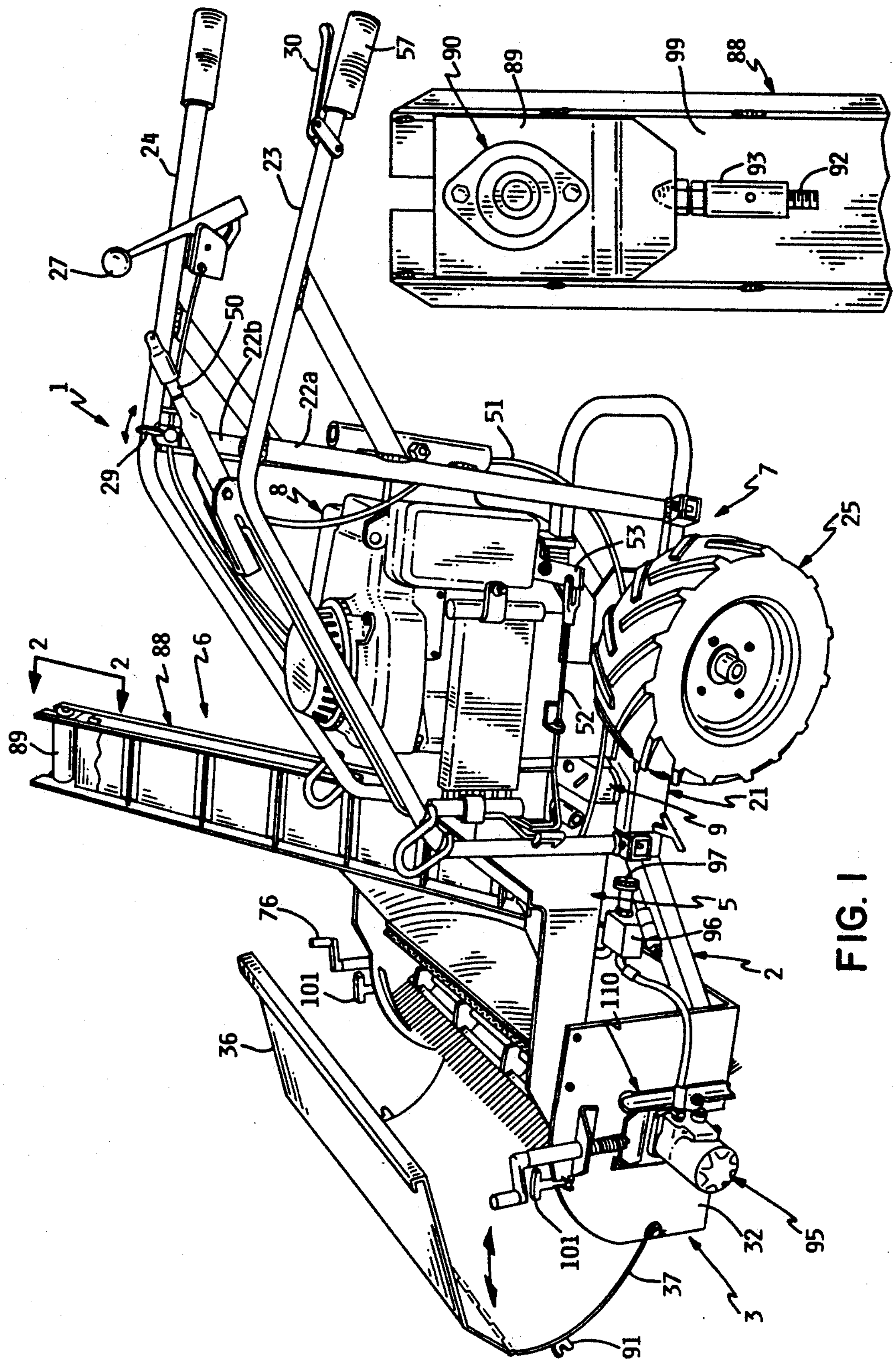
FIG. 1 is perspective view of the present invention.
FIG. 2 is a sectional view along the line 2—2 in FIG. 1 showing the conveyor belt and its mounting.
Figure 3:
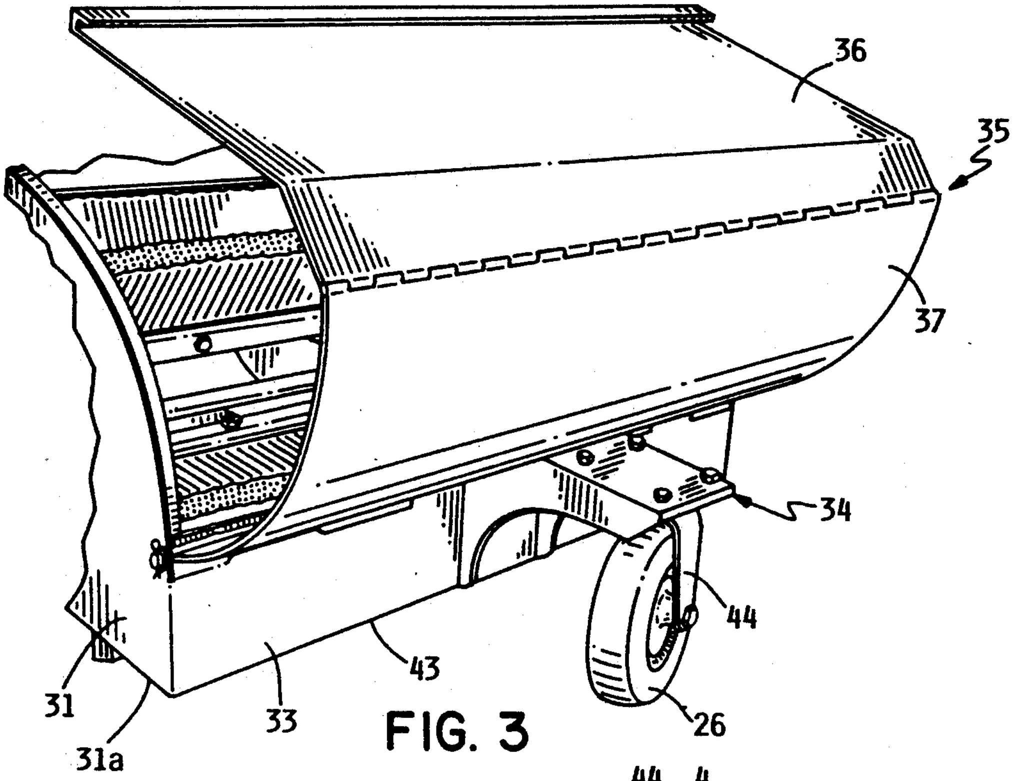
FIG. 3 is a perspective view showing the front of the self propelled carriage.
Figure 5:
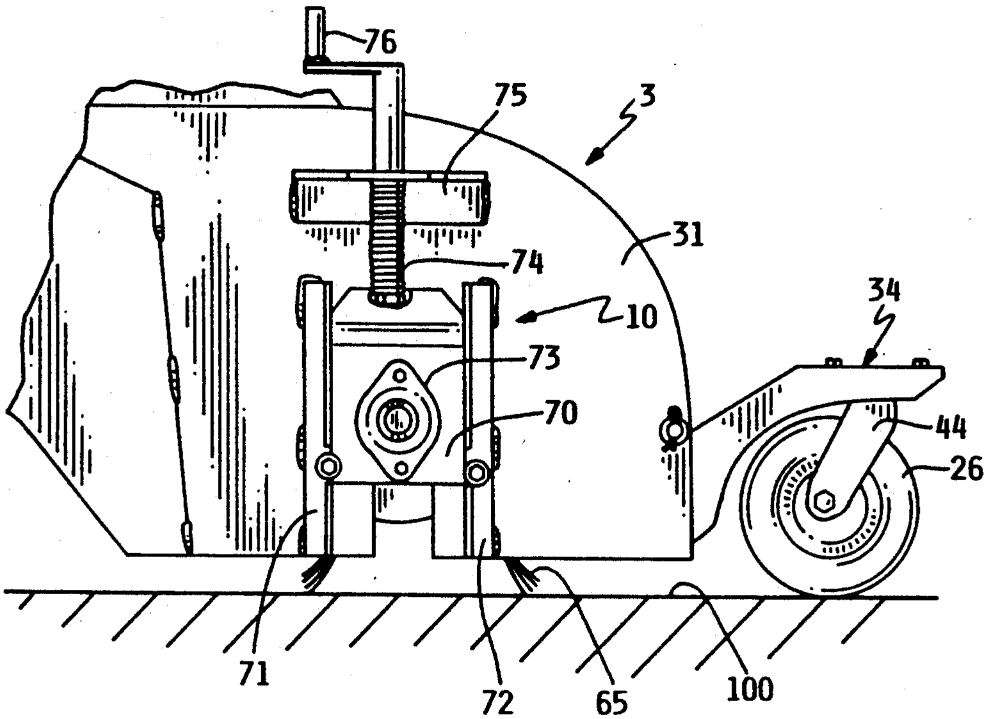
FIG. 5 is a side elevational view showing the paddle assembly height adjustment assembly.

In FIG. 1 there is shown in perspective view a preferred embodiment of the present pickup sweeper invention utilized to remove gravel from flat surfaces such as asphalt type roofs. The pickup sweeper 1 is comprised of a self propelled carriage 2 to which is attached at its front end a paddle assembly 3. Paddle assembly 3 is used to move the gravel forwardly and upwardly into a hopper 5. Operably communicating with the bottom of hopper 5 is a conveyor means 6 which carries the gravel upwardly and outwardly from hopper 5, dispensing it off of the end of the conveyor means to a follow along transport device (not shown) such as a mechanized wheelbarrow like device. It would also be possible to merely collect the gravel on the surface in rows or piles. Self propelled carriage 2 is comprised of a wheeled chassis 7 having a base frame member 21 (with a substantially like member on the opposite side of wheeled chassis 7, not shown), upright frame members 22*a* and 22*b*, and first and second handle members, 23 and 24 respectively, all shown in FIG. 1. A pair of drive wheels 25 (the second wheel not being visible in FIG. 1) provide drive and rolling support to wheeled chassis 7. A pivoted support wheel 26 is attached to the front of paddle assembly 3 to support the front portion of wheeled chassis 7 as is shown in FIGS. 3 and 5. Attached to and serving to propel wheeled chassis 7 is a power source in the form of internal combustion drive engine 8. Drive engine 8 is operably attached to drive wheels 25 by means of a variable speed hydraulic drive 9 which allows the forward and reverse speed of wheeled chassis 7 to be controlled hydrostatically by means of drive control lever 27 as is shown in FIG. 1. It being understood that other variants of construction for wheeled chassis 7 and its support and controls may be utilized consistent with technology well known in the powered chassis art. Similarly, any variety of drive engine may be used for drive engine 8. The foregoing components of self propelled carriage 2 are provided to allow for the controlled self propelled movement of self propelled carriage 2 in the forward and rearward directions, and various maneuvering thereof to facilitate its movement into contact with gravel which is to be picked up and removed.

Figure 4:
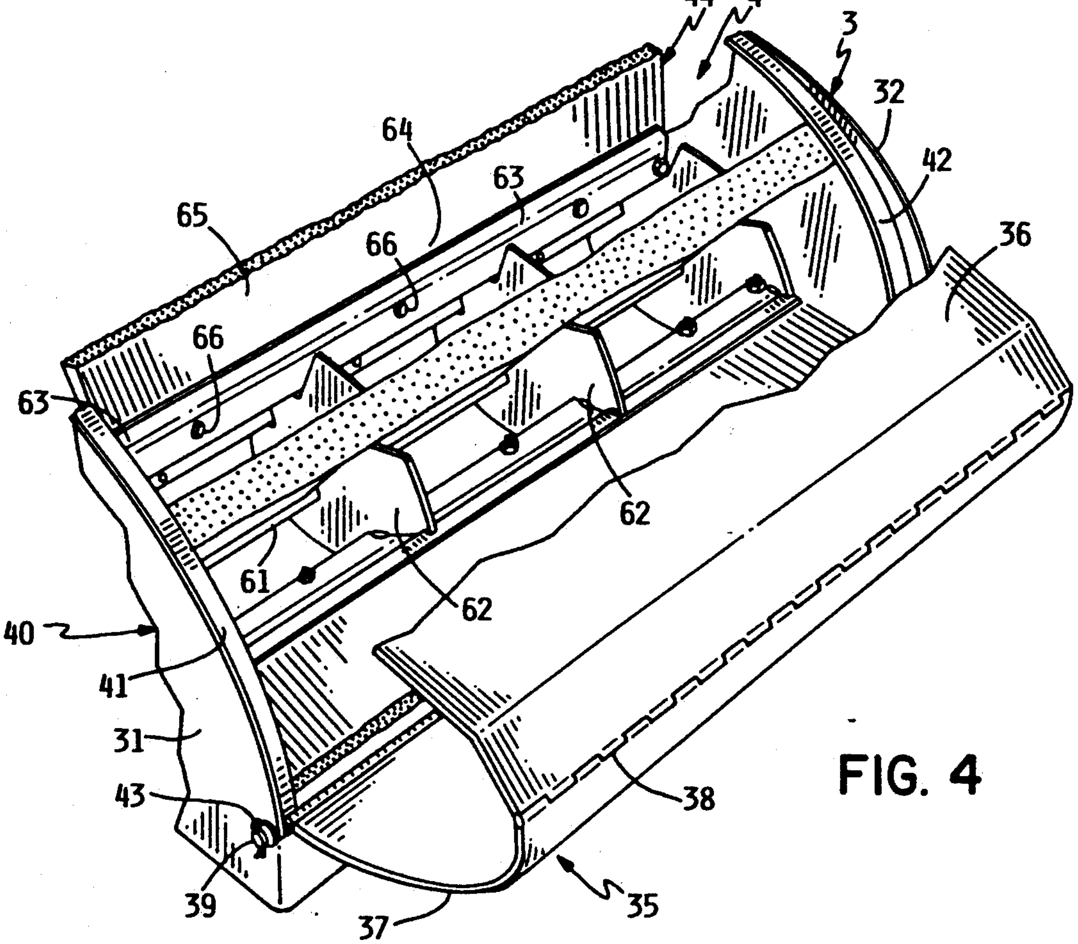
FIG. 4 is a perspective view showing the paddle assembly.

Paddle assembly 3, forming the paddle means, is comprised of a rotatable paddle 4 (shown in FIGS. 3 and 4) housed in paddle housing 40. It is the purpose of paddle assembly 3 to pick gravel up from a roof surface and carry it into hopper 5 through rotation of paddle 4. Paddle housing 40 serves to partially enclose paddle 4 and is comprised of opposed first and second side members, 31 and 32, respectively, a front panel 33 and a moveable paddle cover 35, as shown in FIGS. 3 and 4. Paddle cover 35 is comprised of a top portion 36 which is hingedly attached along one edge by means of a piano hinge 38 to a bottom portion 37. Bottom portion 37 is movably attached to the top edge of front panel 33 by means of pivot rod 39 which allows paddle cover 35 to be moved from a closed to an open position over paddle 4. Pivot rod 39 is carried by the bottom edge of bottom panel 37 and extends through an opening in side panels 31 and 32. A cotter pin 43 is inserted in an opening in at least one end of pivot rod 39 to allow for the removal of pivot rod 39 from engagement with side panels 31 and 32. Attached to the forward interior surfaces of side panels 31 and 32 are first support member 41 and second support member 42, respectively, which are contoured to match the interior contour of paddle cover 35 to support it in its closed position. The hinged and segmented construction of paddle cover 35 allows for the removal and replacement of paddle 4 as well as for the inspection of the paddle area should that be required. Paddle 4 is rotatably positioned within paddle housing 40 to allow gravel to be swept up by paddle 4 and into hopper 5. As is shown in FIG. 1, flexible rubber toggle handles 101 attached to each of side panels 31 and 32, and sized to be received and retained by retention brackets 91 attached to opposite ends of panel 37, serve to forcibly retain cover 35 in its closed position when gravel is being swept by pickup sweeper 1.

Attached to the midsection of front panel 33 is a support bracket 34 shown in FIGS. 3 and 5. Support bracket 34 pivotally carries a wheel yoke 44 to which is rotatably attached support wheel 26. By pivotally mounting support wheel 26 to the mid span of front panel 33 the front end of self propelled carriage 2 is supported in a manner that allows the front end of pickup sweeper 1 to be easily maneuvered forward and backward, and from side to side to selectively encounter gravel which is to be swept up.

Paddle 4 is comprised of a plurality of individual paddle members 44 which are elongated members intended to extend generally between side panels 31 and 32. In the preferred embodiment six panel members 44 are utilized in substantially equal angular spacing around paddle axle 61. In alternative embodiments, a different number of individual, discreet paddle members may be used. Each elongated paddle member 44 has a mounting portion 64 and an impact portion 65 as shown in FIG. 4. Mounting portion 64 carries mounting means, in the form of a plurality of mounting bolt holes (not shown) which receive mounting bolts 66. Impact portion 65 is radially positioned outwardly from mounting portion 64 and is intended to impact the gravel being swept to carry it upwardly into hopper 5. Mounted on paddle axle 61, and spaced along it, are a plurality of radial support webs 62 as shown in FIG. 4. Radial support webs 62 support a plurality of support brackets 63 which extend parallel to paddle axle 61. In the preferred embodiment, each of support brackets 63 defines an extended opening slot into which may be received the bottom edge of a paddle mounting portion 64. A plurality of bolt holes (not shown) are spaced along support bracket 63 and are intended to be indexed with bolt holes in the mounting portions 63 of paddle members 44. Mounting bolts 66 extend through the bolt holes in paddle member 44 and mounting brackets 63 to hold paddle members 44 in selected radial relationship to paddle axle 61.

Figure 7:
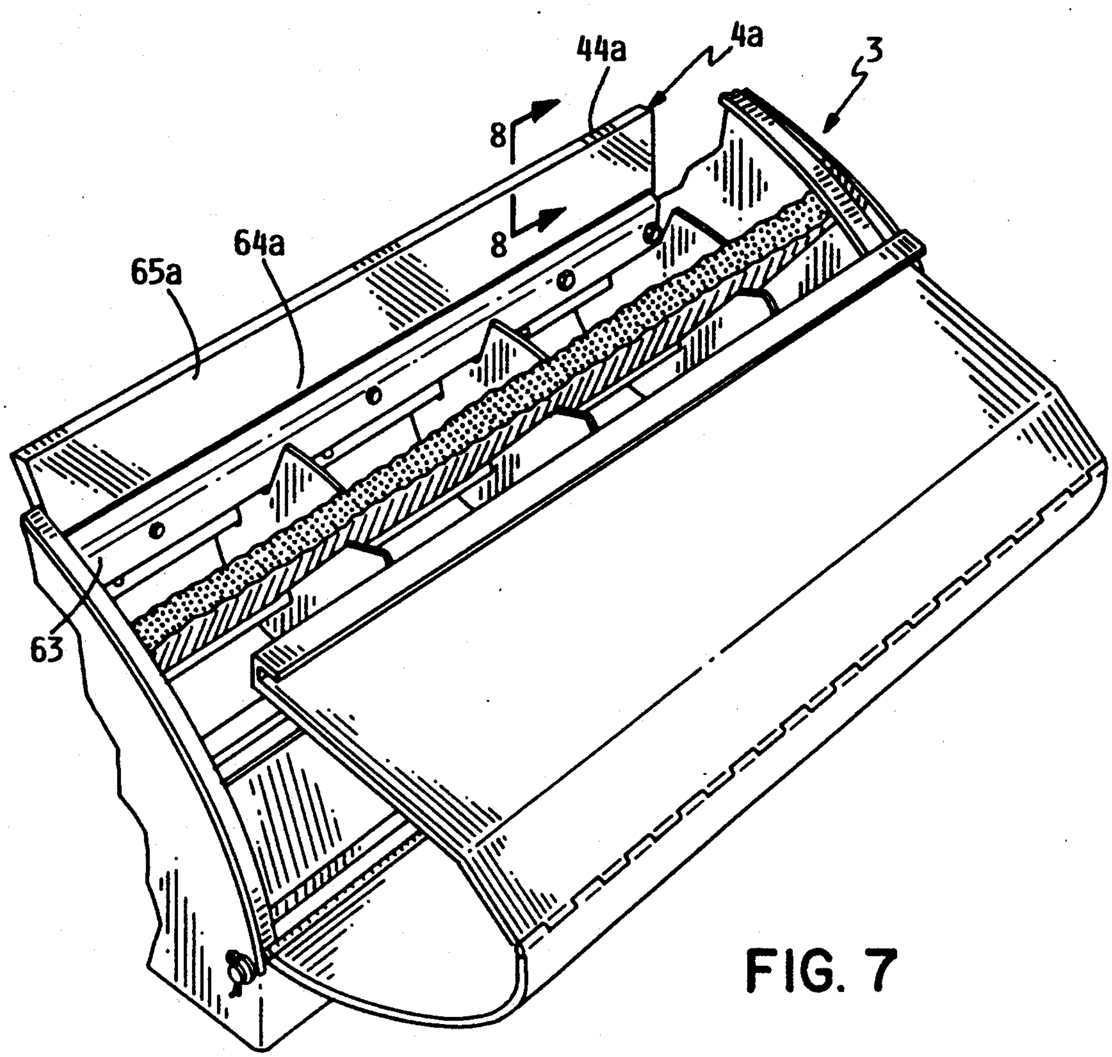
FIG. 7 is a perspective view showing an alternative embodiment of the paddle assembly.
Figure 8:
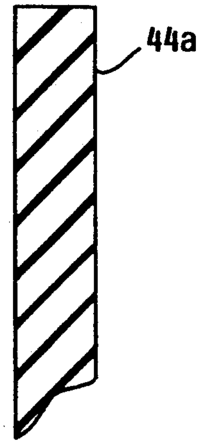
FIG. 8 is a sectional view along the line 8—8 in FIG. 7 showing the solid paddle material.

In one preferred embodiment, shown in FIGS. 3, 4 and 5, paddle members 44 are fabricated in the form of a bristle brush with the bristles extending radially outward from, and being mounted in, mounting brackets 63. In an alternative embodiment, shown in FIGS. 7 and 8, alternating paddle members are comprised of a solid, rubber like panel, designated in the drawings as paddle members 44*a*. Paddle members 44*a* are comprised of a mounting portion 64*a* and an impact portion 65*a* as shown in FIG. 7. It would also be possible to use all solid paddle members (not shown) instead of alternating solid paddle members with bristle member. It has been found, however, that the embodiment with bristle members forming at least a portion of the plurality of paddle members improved sweeping of the roof surface 98 is accomplished, with dust and other fine debris being removed with the gravel to a greater extent. Solid paddle members 44*a* have an approximate thickness of 0.375 inches, and are made of a synthetic rubber material manufactured by Boston having the following product ID number: "Bull Dog" #47-7164. It is important that paddle members 44 and 44*a* have sufficient resilience and flexibility to resist total deformation when impacting and sweeping up coarse gravel, yet have sufficient flexibility to absorb the impact shock of gravel and operably interface with the gravel and surface 100 on which the gravel lies. This would not be accomplished as well if paddle members 44 were formed of a rigid material, such as a steel plate. In one embodiment, paddle member 44 is formed of a polypropylene bristle strip brush having a trim dimension of 4 inches, a brush face width of 0.75 inches and a face length of 29 inches. These paddle members are manufactured by FMC Corporation. It is to be understood that a variety of materials may be utilized for paddle members 44 and 44*a* which have sufficient flexibility to form an integral interface with surface 100 when paddle 4 is rotating.

Paddle axle 61 is movably mounted to self propelled carriage by means of height adjustment assemblies 10 and 110 which are mounted to each of first and second side panels 31 and 32, respectively, as shown in FIGS. 1 and 5. To allow for vertical adjustment of the position of paddle axle 61, at the end positioned in side panel 31, a mounting block 70 is slidably mounted between opposed first and second guide rails 71 and 72 shown in FIG. 5. Any variety of gliding means well known in the art to allow mounting block 70 to be slidably mounted between guide rails 71 and 72 may be utilized. A bearing assembly 73 is attached to mounting blocks 70 to support therein one end of paddle axle 61 by means well known in the art. The vertical position of mounting blocks 70 may be selected by rotation of screw rod 74, attached to height adjustment handle 76 which is screw mounted in screw bracket 75. By rotating height adjustment handle 76, the height of mounting block 70, and paddle axle 61, is varied. Similarly, at the end of axle 61 mounted in side panel 32, height adjustment assembly 110 is mounted in the same type of sliding block mechanism described as comprising height adjustment assembly 10. However, in the embodiment of height adjustment assembly 110, a hydraulic drive motor 95, operably attached to and driving paddle axle 61, is positioned on the mounting block 70. In this manner of mounting paddle 4 and paddle axle 61 to be moveable vertically in a selected manner using height adjustment handles 76 at each end of paddle axle 61, the spacial interface between surface 100 and the impact portion 65 of paddle members 44 may be selectively varied to obtain an operable interface therebetween which suitably allows for the effective sweeping and movement of the particular coarseness of gravel being encountered. It has generally been found that having paddle members 44 (or 44*a*) in flexed contact with surface 100 allows for suitable sweeping of gravel. However, other operable interfaces or contacts may also be acceptable. The vertical adjustment of paddle axle 61 also allows for the variation of spacing between surface 100 and paddle members 44 as the impact portions 65 are warn down due to wear. Paddle members 44 may be removed as they wear by means of mounting bolts 66. In operation of one embodiment of the present invention, wherein paddle members 44 were approximately 29 inches in width, a rotational speed of 200 rpm was imparted to paddle 4 to sufficiently move coarse gravel.

Figure 6:
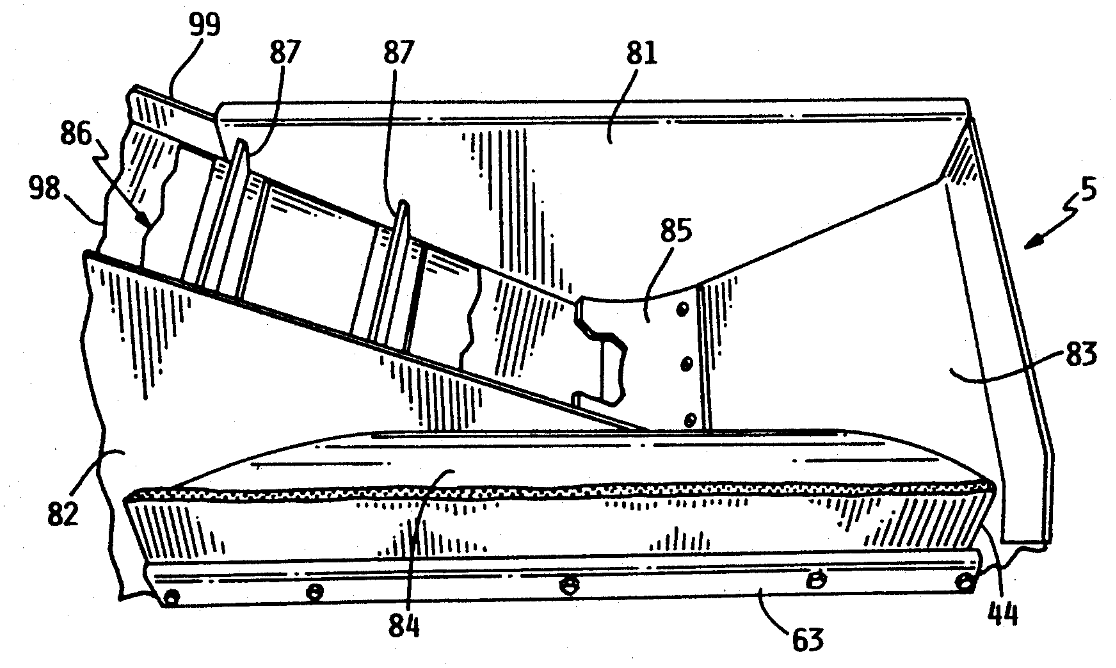
FIG. 6 is a perspective view showing the hopper and conveyor belt.

Hopper 5 is provided to funnel gravel which is swept upwardly and backwardly into it onto conveyor means 6. As is shown in FIG. 6, hopper 5 is comprised of a back panel 81, a first side element 82, a generally opposed second side element 83 and a front element 84, all being interconnected to form a generally funnel like bin to funnel gravel onto the base end of conveyor means 6. Front element 84 is curved from bottom to top to generally conform to the exterior contour of paddle 4 which is positioned in front of it. It has been found that it is permissible to have a space between the outside edges of paddle members 44 and the inside surface of paddle cover 35 and still be able to sufficiently enclose gravel to convey it upwardly under enclosure 35 to hopper 5. First side element 82 extends between front element 84 and a side of conveyor means 6. A bottom portion of second side element 83 is attached to a flexible web 85 which spans the bottom of hopper 5 and partially overlays the bottom of a conveyor belt 86 having a plurality of upstanding belt cleats 87 that form a portion of conveyor means 6, as shown in FIG. 6. The edge of flexible web 85 that overlays conveyor belt 86 is free to move up and down, being biased into its down position, in order to allow belt cleats 87 to pass beneath it as conveyor belt 86 travels on its mounting. In this way, gravel accumulating in the bottom of hopper 5 does not pass between flexible web 85 and belt 86 to escape the hopper.

Conveyor means 6 is intended to move gravel from hopper 5 upwardly and outwardly of pickup sweeper 1 to a gathering device (not shown) that would travel alongside pickup sweeper 1. It is comprised of an endless conveyor belt 86 having a plurality of upstanding belt cleats 87 that span belt 86 and which are intended to move gravel upwardly as conveyor belt 86 moves. Conveyor belt 86 is rotatably mounted to a belt frame 88 which is supported by support panel 98 extending between frame members 99 as shown in FIG. 2. Belt frame 88 carries a rotatable top shaft 89 and a bottom belt shaft (not shown) over which conveyor belt 86 is mounted. Top belt shaft 89 is mounted to opposed belt bearings 90 (only one being shown), each of which is carried by moveable belt blocks 89 (only one shown) attached to side frame members 99 (only one being shown in the drawings). Belt blocks 89 are mounted to be moveable along the longitudinal axis of conveyor belt 86. A screw bolt 92, attached to side frame member 91, can be retracted or advanced in screw bolt fastener 93 to tighten or loosen conveyor belt 86 on belt frame 88. This allows belt 86 to be tightened and loosened as the belt stretches or as may be necessary for removal and replacement of conveyor belt 86. It has been found to be particularly beneficial in the preferred embodiment to incline conveyor belt 86 approximately 35–40 degrees above horizontal, although other angles may also be sufficient depending upon the overall size and geometry of the components of pickup sweeper 1.

Conveyor belt 86 is driven at its bottom end by means of a hydraulic belt drive motor (not shown). It has been found advantageous to the practice of the present invention to drive the conveyor belt 86 from the bottom because it is not necessary that the hydraulic drive motor that drives conveyor belt 86 be positioned near the top of conveyor means 6 where it can be more easily damaged by thrown debris, and because the hydraulic hoses used to drive the motor at the bottom are less exposed to damaging materials. The rotational speed of conveyor belt 86 is varied by changing the speed of the hydraulic belt drive motor operably attached to the lower end of conveyor belt 86. The speed of the belt drive motor is controlled by means of a belt drive control valve 96, the flow of which is selectively regulated by varying a belt control valve knob 97, shown in FIG. 1. It has been found important to the practice of the present invention to have control over the forward speed of pickup sweeper 1 as well as over the speed conveyor belt 86. It has been found that by selectively matching the forward speed of self propelled carriage 2 and the rotational speed of conveyor belt 86 to the depth and size of the gravel being gathered, up to 95% of the gravel encountered along the path of pickup sweeper 1 can be gathered in a single sweep.

Paddle 4 is driven by means of paddle axle 61 which is rotated by means of hydraulic drive motor 95 shown in FIG. 1. Hydraulic drive motor 95 and the drive motor for conveyor belt 86 are hydraulically driven by means of an auxiliary hydraulic pump (not shown) located near the back of drive engine 8. This auxiliary pump is operably attached to drive engine 8 by means of a belt and pulley (not shown). The power provided by the auxiliary hydraulic pump may be stopped and started by means of engagement lever 50 shown in FIG. 1. By moving lever 50 from an engaged to a disengaged position, a control cable 51 and attached control rod 52, which are operably attached to lever 50, may be moved to pivot control arm 53 (FIG. 1) so as to engage and disengage the pulley and belt which operably connect drive engine 8 to the auxiliary hydraulic drive. Thus, my moving engagement lever 50 from one position to another, the rotation provided to conveyor belt 86 and paddle 4 may be stopped and started. By so engaging lever 50 pickup sweeper 1 may be maneuvered under power without the need to rotate paddle 4 and conveyor means 6.

The output shaft speed of drive engine 8 is controlled by means of a throttle lever 29 operably connected by means of a control cable (not shown). In the preferred embodiment, throttle lever 29 is mounted to member **22*b* as shown in FIG. 1. Throttle lever 29 varies the drive engine 8 rpm which in turn drives the various hydrostatic power units referred to previously. The operator would select a suitable setting for lever 29. Throttle lever 29 may also be used to shut off pickup sweeper 1** when its use is terminated.

To prevent the unintended powered movement of self propelled carriage 2, a stopping lever 30 is attached to handle member 23, as shown in FIG. 1. When stopping lever 30 is in it up position, biased to such position by spring means or the like (not shown), a pressure relief valve (not shown) on the hydrostatic drive that rotates drive wheels 25 is opened preventing hydrostatic drive from being imparted to drive wheels 25. When stopping lever 30 is held in its down position by a hand being wrapped around the grip 57 on handle member 23 with lever 30 held down against grip 57, the pressure relief valve is closed and drive is imparted to drive wheels 25. Thus, when the machine operator leaves his operating position for any reason his release of lever 30, and the biasing of lever 30 to its upward position, would stop the powered movement of self propelled carriage 2 even if the operator had not disengaged motion by placing drive control lever 27 in its neutral position.

The method of operation incorporated in the present invention includes the steps of advancing the pickup sweeper 1 forward so as to move the gravel forward to where it can be swept up by a paddle mechanism. This is accomplished as the pickup sweeper paddle rotates to move gravel forward. The gravel so moved into position is then accumulated and moved upwardly in intermittent gatherings by the centrifugal force imparted to it by rotational movement of discreet paddles, each impacting successive relatively small portions of gravel. The gravel is then moved into a hopper by centrifugal force imparted to it, channeled in that direction by an accurately shaped enclosure, where it is funneled onto a conveyor and conveyed at a selected speed to a point where it can be received into a transport device. More succinctly stated, the present invention discloses a method for removing loose gravel from the roof of a buildings and the like wherein a rotatable paddle means is provided and the gravel is contacted by the paddle means. Hopper means are provided adjacent the paddle means, and the paddle means are rotated in a manner such that the gravel is gathered and lifted into the hopper means. The conveyor means are positioned relative to the hopper means in a manner that allows the gravel to be removed from the hopper means.

What is claimed is:

1. Roof gravel gathering apparatus for removing gravel of mixed diameter from a roof surface and discharging it into a transport device positioned along side, said apparatus comprising:

(a) a self propelled carriage, said carriage being operable in response to command from an operator located in an operator's position relative to said carriage;

(b) rotatable gravel sweeping means carried by said self propelled carriage for picking up roofing gravel ranging in diameters from pea gravel size to 2 inches, said gravel sweeping means having a periphery;

(c) hopper means carried by said self propelled carriage for receiving gravel therein from said rotatable gravel sweeping means and funnelling it in a selected output direction;

(d) a housing at least partially enclosing said rotatable gravel sweeping means, said housing having a contoured portion generally conforming to a periphery of at least a portion of said rotatable gravel sweeping means thereby providing an enclosed gravel passageway;

(e) said rotatable gravel sweeping means including movable mounting means to move said gravel sweeping means relative to said self propelled carriage to compensate for wear of said gravel sweeping means;

(f) conveyor means to convey gathered gravel out of said hopper means;

(g) said conveyor means being oriented on said self propelled carriage so as to convey said gravel in a direction transverse to a direction of travel of said self propelled carriage;

(h) a power source carried by said self propelled carriage for propelling said carriage, for rotating said rotatable gravel sweeping means, and for driving said conveyor means;

(i) adjustment means to vary a speed of rotation of said rotatable gravel sweeping means;

(j) speed variation means to vary a speed of movement of said self propelled carriage;

(k) drive control means to vary the speed of movement of said self propelled carriage;

(l) engagement control means to vary the speed of rotation of said rotatable gravel sweeping means;

(m) said conveyor means including an endless belt having a plurality of spaced cleats mounted thereon to retain the gravel on said belt;

(n) said endless belt being supported on top and bottom shafts, at least one of said top and bottom shafts being moveable relative to the other shaft; and (o) said rotatable gravel sweeping means including a plurality of brush bristles for gathering gravel into said hopper means.

2. The apparatus of claim 1 wherein said power source includes a hydrostatic power means to hydrostatically power said self propelled carriage.

3. The apparatus of claim 1 wherein said rotatable gravel sweeping means comprises a paddle assembly including:

(a) first and second ends;

(b) an axle positioned between said first and second ends; and (c) a plurality of paddle members secured about said axle.

4. Apparatus in accordance with claim 3, wherein each of said plurality of paddle members comprises a bristled brush.

5. Apparatus in accordance with claim 3, wherein at least one of said plurality of paddle members comprises a rubber like panel.

6. Apparatus in accordance with claim 3, wherein said plurality of paddle members comprises a mixture of paddle member types, said paddle member types including paddle members comprised of a brush and paddle members comprised of a rubber like panel.

7. Apparatus in accordance with claim 1 including automatic stopping means to automatically stop the powered movement of said self propelled carriage when the operator leaves the operator's position.

8. Roof gravel gathering apparatus for removing gravel of mixed diameter from a roof surface and discharging it into a transport device positioned along side, said apparatus comprising:

(a) a self propelled carriage, said carriage being operable in response to command from an operator located in an operator's position relative to said carriage;

(b) rotatable gravel sweeping means carried by said self propelled carriage for picking up roofing gravel ranging in diameter from pea gravel size to 2 inches, said gravel sweeping means having a periphery;

(c) hopper means carried by said self propelled carriage for receiving gravel therein from said rotatable gravel sweeping means and funnelling it in a selected output direction;

(d) a housing at least partially enclosing said rotatable gravel sweeping means, said housing having a contoured portion generally conforming to a periphery of at least a portion of said rotatable gravel sweeping means thereby providing an enclosed gravel passageway;

(e) said rotatable gravel sweeping means including movable mounting means to move said gravel sweeping means relative to said self propelled carriage to compensate for wear of said gravel sweeping means;

(f) conveyor means to convey gathered gravel out of said hopper means;

(g) said conveyor means being oriented on said self propelled carriage so as to convey said gravel in a direction transverse to a direction of travel of said self propelled carriage;

(h) a power source carried by said self propelled carriage for propelling said carriage, for rotating said rotatable gravel sweeping means, and for driving said conveyor means;

(i) adjustment means to vary a speed of rotation of said rotatable gravel sweeping means;

(j) speed variation means to vary a speed of movement of said self propelled carriage;

(k) drive control means to vary the speed of movement of said self propelled carriage;

(l) engagement control means to vary the speed of rotation of said rotatable gravel sweeping means;

(m) said conveyor means including an endless belt having a plurality of spaced cleats mounted thereon to retain the gravel on said belt;

(n) said endless belt being supported on top and bottom shafts, at least one of said top and bottom shafts being moveable relative to the other shaft;

(o) said rotatable gravel sweeping means including a plurality of brush bristles for gathering gravel into said hopper means; and (p) said power source including a hydrostatic power means to hydrostatically power said self propelled carriage.

9. Apparatus in accordance with claim 8, including automatic stopping means to automatically stop powered movement of said self propelled carriage when the operator leaves the operator's position.

10. Roof gravel gathering apparatus for removing gravel of mixed diameter from a roof surface and discharging it into a transport device positioned along side, said apparatus comprising:

(a) a self propelled carriage, said carriage being operable in response to command from an operator located in an operator's position relative to said carriage;

(b) rotatable gravel sweeping means carried by said self propelled carriage for picking up roofing gravel ranging in diameter from pea gravel size to 2 inches, said gravel sweeping means having a periphery;

(c) hopper means carried by said self propelled carriage for receiving gravel therein from said rotatable gravel sweeping means and funnelling it in a selected output direction;

(d) a housing at least partially enclosing said rotatable gravel sweeping means, said housing having a contoured portion generally conforming to a periphery of at least a portion of said rotatable gravel sweeping means thereby providing an enclosed gravel passageway;

(e) said rotatable gravel sweeping means including movable mounting means to move said gravel sweeping means relative to said self propelled carriage to compensate for wear of said gravel sweeping means;

(f) conveyor means to convey gathered gravel out of said hopper means;

(g) said conveyor means being oriented on said self propelled carriage so as to convey said gravel in a direction transverse to a direction of travel of said self propelled carriage;

(h) a power source carried by said self propelled carriage for propelling said carriage, for rotating said rotatable gravel sweeping means, and for driving said conveyor means;

(i) adjustment means to vary a speed of rotation of said rotatable gravel sweeping means;

(j) speed variation means to vary a speed of movement of said self propelled carriage;

(k) drive control means to vary the speed of movement of said self propelled carriage;

(l) engagement control means to vary the speed of rotation of said rotatable gravel sweeping means;

(m) said conveyor means including an endless belt having a plurality of spaced cleats mounted thereon to retain the gravel on said belt;

(n) said endless belt being supported on top and bottom shafts, at least one of said top and bottom shafts being moveable relative to the other shaft; and (o) said rotatable gravel sweeping means comprising a paddle assembly including:

(i) first and second ends;

(ii) an axle positioned between said first and second ends;

(iii) a plurality of paddle members secured about said axle, said plurality of paddle members comprising a mixture of paddle member types, said paddle member types including paddle members comprised of a brush and paddle members comprised of a rubber like panel.

11. Apparatus in accordance with claim 10 including automatic stopping means to automatically stop powered movement of said self propelled carriage when the operator leaves the operator's position.

12. A method for removing loose roofing gravel ranging from pea gravel size to 2 inches in diameter from a roof surface, the method comprising the steps of:

(a) providing a powered self propelled carriage operable in response to command from an operator located in an operator's position relative to said carriage;

(b) providing rotatable sweeping means that will sweep up gravel ranging from pea gravel size to 2 inches in diameter;

(c) providing hopper means to receive therein said gravel;

(d) moving said rotatable sweeping means to contact said gravel and move it upwardly into said hopper means;

(e) providing a partially enclosed gravel passageway communicating between said sweeping means and said hopper means to help propel said gravel therethrough from the force imparted to it by said rotatable sweeping means;

(f) providing conveyor means to move generally round gravel upwardly;

(g) positioning said conveyor means relative to said hopper means to thereby remove said gravel from said hopper means;

(h) providing power means to propel said self propelled carriage, to rotate said gravel sweeping means, and to drive said conveyor means; and (i) positioning said conveyor means transverse to a direction of travel of said self propelled carriage to provide side discharge of said gravel from said conveyor.

13. The method of claim 12, further including the steps of:

(a) providing control means to control a speed of advancement of said self propelled carriage; and (b) providing said rotatable sweeping means with a plurality of brush bristles.

14. The method of claim 13, further including the step of providing said rotatable sweeping means with a plurality of rubber like panels intermixed with said plurality of brush bristles.

15. The method of claim 13 further including the step of providing automatic control means to automatically stop the powered movement of said self propelled carriage when the operator leaves the operator's position.

16. The method of claim 15 further including the step of providing a hydrostatic power means to hydrostatically power said self propelled carriage.

* * * * *